Figure 1:
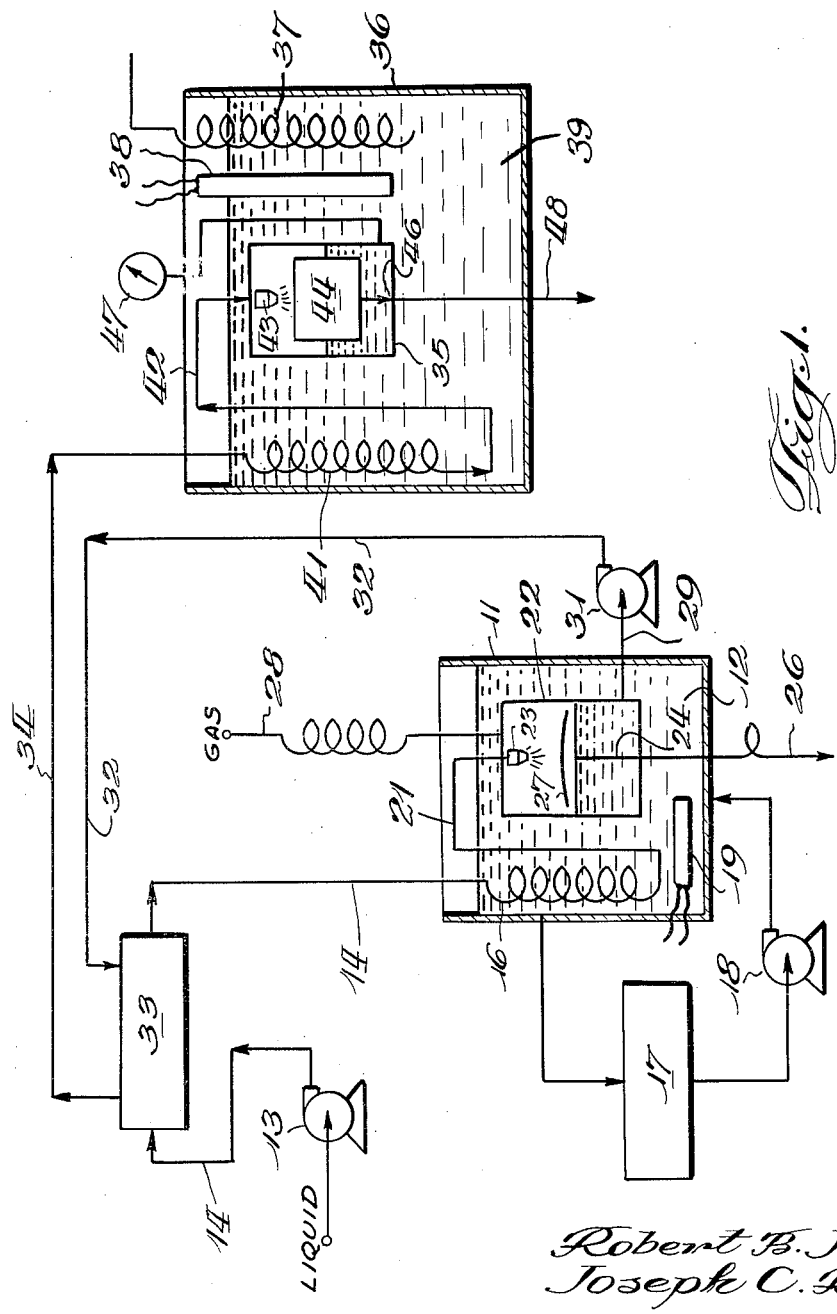

June 5, 1962   R. B. JACOBS ET AL   3,037,375
CONTINUOUS VAPOR PRESSURE APPARATUS
Filed Dec. 29, 1959   3 Sheets-Sheet 3

INVENTORS.
Robert B. Jacobs
Joseph C. Rhodes

United States Patent Office 3,037,375
Patented June 5, 1962

3,037,375
CONTINUOUS VAPOR PRESSURE APPARATUS
Robert B. Jacobs, Homewood, and Joseph C. Rhodes, Park Forest, Ill., assignors to Standard Oil Company, Chicago, Ill., a corporation of Indiana
Filed Dec. 29, 1959, Ser. No. 862,629
8 Claims. (Cl. 73—53)

This invention relates to an apparatus for determining the vapor pressure of a liquid or mixture of liquids having different boiling points, and containing dissolved gases. More particularly it relates to an apparatus for continuously determining the vapor pressure of a gasoline.

One of the critical product specifications which must be met in the manufacture of gasolines is that of vapor pressure. This property of a gasoline is of great significance in that it is related to the vapor locking tendency of a gasoline used as a fuel, and consequently engine performance is affected. Also, the vapor pressure is a measure of the potential evaporative loss during storage. The total pressure above a liquid is determined by the vapor pressure of the liquid and the partial pressure of any gases, such as air, which may be dissolved in the liquid.

Since gasolines are a mixture of hydrocarbons having different boiling points, the total pressure will depend upon the ratio of vapor space to liquid volume, temperature, composition and amount of dissolved air. The most common method of determining vapor pressure used by the petroleum industry is the Reid vapor pressure test, the conditions of which are set out in ASTM specification D-323-58. The Reid method eliminates discrepancies due to varying amounts of dissolved air which result from different refinery processing and storage conditions. In brief, the ASTM method calls for saturating a given volume of gasoline with air at atmospheric pressure and at a temperature between 32° F. and 40° F. This saturated gasoline is then heated to a temperature of 100° F., the vapors are stripped from the heated gasoline into an air chamber which has a volume of 4 times the sample volume. The total pressure of the equilibrium vapors and air above the remaining liquid gasoline is measured as the Reid vapor pressure (RVP). The ASTM method is a time consuming manual operation which is tedious and requires the careful attention of one conducting the test in order to obtain reproducible results. A number of instruments have been developed for measuring vapor pressure which instruments, in general, are designed to correlate with the Reid vapor pressure test. These instruments are subject to errors which may be introduced by dissolved air, bath temperature, gasoline composition, the pressure recorder, and meter rate. One type of instrument which has been developed uses the evacuated bulb technique for measuring vapor pressures, and has been found to be less cumbersome and of somewhat greater precision than that of the standard Reid method. This technique is described in the article "Rapid Precise Vapor Pressure Method" A. Y. Mottlau Analytical Chemistry, August, 1957. However, this method is not continuous, requires careful handling, and involves the manual saturation technique of the Reid method. Other similar instruments have been found to be sensitive to gasoline composition and to the amount of dissolved gases, so that reproducible results are difficult to achieve.

An object of this invention is to provide an apparatus for continuously measuring the vapor pressure of a liquid containing dissolved gases. Another object is to provide an apparatus for continuously measuring the vapor pressure of a mixture of liquids having different boiling points which apparatus gives consistent determinations with a minimum of error. A more particular object is to provide an apparatus for continuously and automatically determining the vapor pressure of a gasoline which apparatus gives results having a good correlation with the Reid method. Still another object of the invention is to provide an apparatus for saturating a mixture of liquids having different boiling points with a gas whereby the amount of the gas which is absorbed in the liquids corresponds to the amount which would be absorbed in the liquids under particular conditions of temperature and pressure. Other objects of the invention will be apparent to one skilled in the art from the following detailed description of the preferred forms of our invention.

In accordance with the principles of the invention, an apparatus is provided for continuously determining the vapor pressure of a liquid which includes a means for saturating the liquid with a particular gas so that the partial pressure of the gas at test conditions is equal to the partial pressure of the gas which would be above the surface of the liquids at a particular temperature and pressure, a means for maintaining the liquid at particular test conditions and a means for indicating the total pressure of the vapors and gases in equilibrium with the liquids.

Figure 2:
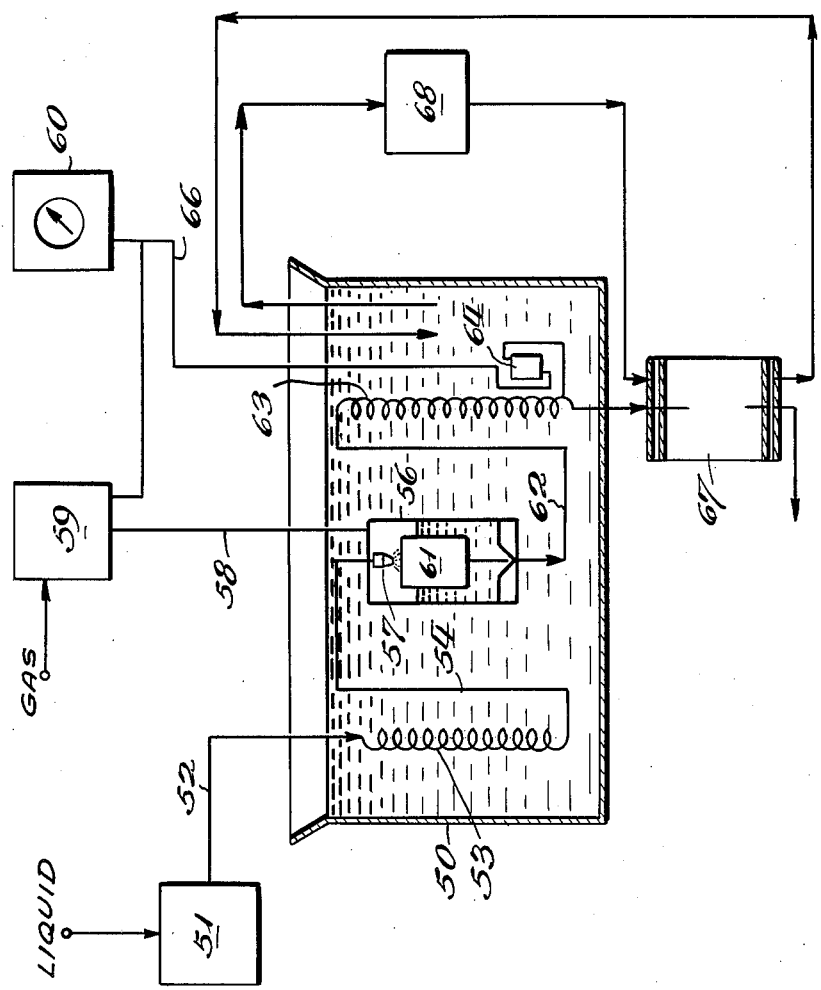
Figure 3:
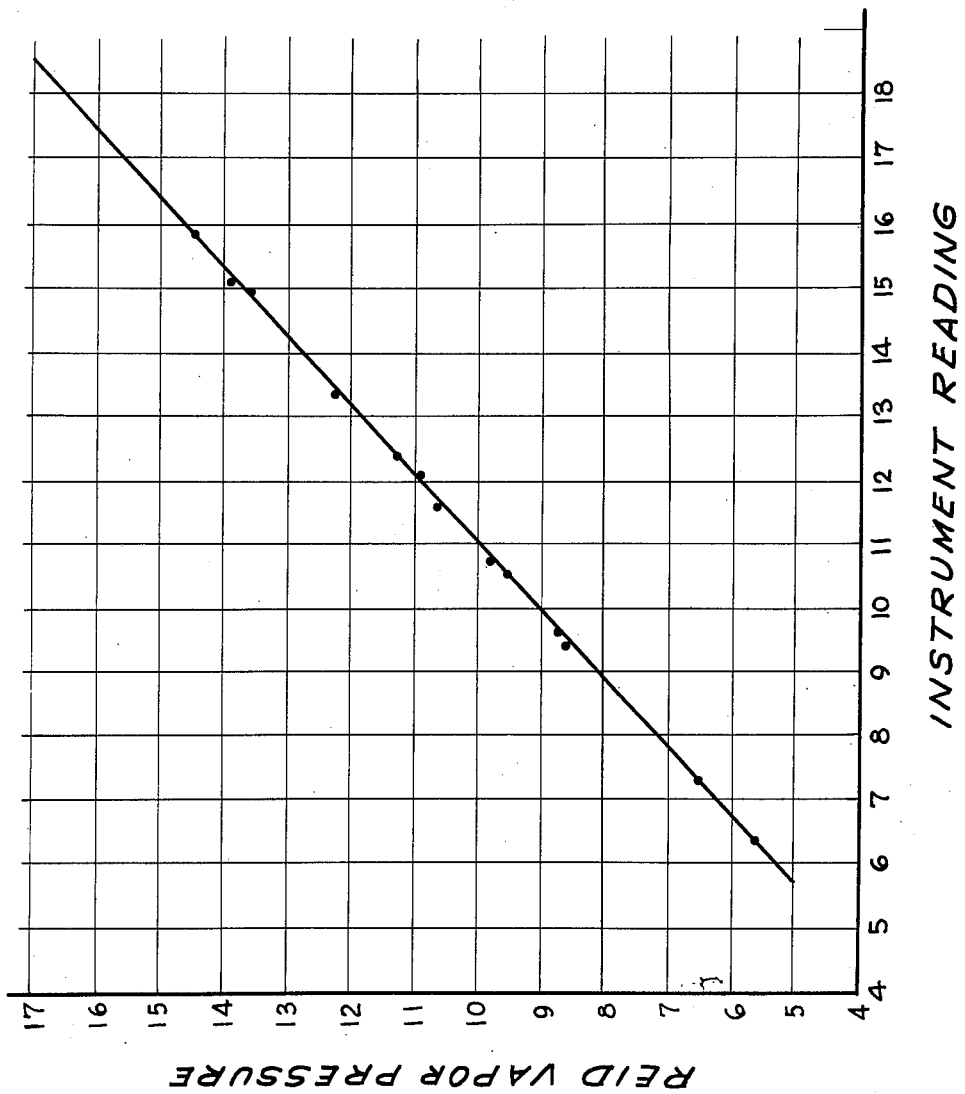

A fuller understanding of our invention may be had by referring to the following detailed description of the invention and to the attached drawings which are applied to RVP determination of gasoline as a specific embodiment wherein FIGURE 1 is a schematic representation of one embodiment of the invention having an atmospheric saturation chamber, FIGURE 2 is a schematic representation of the preferred embodiment of the invention having a pressured saturation chamber, and FIGURE 3 shows a graphical correlation of the vapor pressure obtained by the instant apparatus with Reid vapor pressure.

Referring to FIGURE 1, a constant temperature bath 11 having a bath fluid 12 circulating therein may be used to attain the desired temperature at which saturation is to be effected. The saturation temperature will be determined by the liquid being tested and the specified test conditions. The bath fluid 12 preferably is water but any suitable fluid may be used, depending upon the temperature at which the bath is maintained. The bath temperature may be maintained by passing the bath fluid 12 through a heat exchanger 17 and circulating it by means of pump 18, with a temperature control means, such as thermostat 19, provided to maintain the desired bath temperature. However, an ice bath or other means of attaining constant temperature may be used.

A pump 13 preferably is used as a means for supplying the liquid by way of line 14 to a heat exchange means 16 which may be used to bring the incoming liquid to a particular temperature. After passing through the heat exchange means 16, which is preferably a tubular coil immersed in the bath fluid, the liquid is carried by line 21 to a saturation chamber 22 which may be immersed in the bath fluid 12. The purpose of the saturation chamber 22 is to saturate the liquid with a gas and it is desirable that the gas and the liquid attain equilibrium conditions as rapidly as possible. This may be facilitated by the use of the spray nozzle 23 which breaks up the stream of liquid so that it comes into intimate contact with the gas. A liquid level is maintained in the saturation chamber 22 by means of a standpipe 24. Preferably a splash shield 27 is used in the vapor space above the liquid level. A vent line 28 is provided in the saturation chamber 22 whereby the gas is supplied to the saturation chamber and the pressure within the chamber is maintained at the gas pressure existing at the open end of the vent line 28.

The liquid containing the dissolved gas may be withdrawn from the saturation chamber 22 through line 29 by means of pump 31 which pumping rate may be less than the liquid supply rate provided by the pump 13. The excess liquid then will overflow into the standpipe 24 and is carried from the system by the drain line 26. This also serves to prevent undissolved gas from being withdrawn from the saturation chamber 22. Advantageously the liquid containing dissolved gas may be passed by way of line 32 through a second heat exchange means 33 where it is used to exchange heat with the incoming liquid supplied to the apparatus, and thereby reduce the load on the heat exchanger 17.

From the heat exchange means 33 the liquid is passed by way of line 34 to a float chamber 35 which may be immersed in a second constant temperature bath 36. The purpose of the second constant temperature bath 36 is to bring the saturated liquid to the temperature at which the vapor pressure is to be measured. Thus, the bath temperature will be selected accordingly. Generally, the bath will serve to heat the saturated liquid and therefore the desired bath temperature may be maintained by means of a heater 37 and a temperature controller 38 immersed in the bath fluid 39. The bath fluid preferably is water but may be any other suitable fluid.

The gas-saturated liquid may be passed through a heat exchange means 41 to bring the saturated liquid to the temperature at which it is desired to measure the vapor pressure. After passing through the heat exchange means 41 the liquid is carried by line 42 into the float chamber 35 and preferably is introduced therein by means of a spray nozzle 43. The spray nozzle 43 is preferred because it enables the liquid phase and the vapor phase to more readily attain equilibrium within the float chamber 35. A constant liquid level is maintained within the float chamber 35 by means of a float valve comprised of a float 44 and a needle valve 46. The pressure of the equilibrium vapors and the partial pressure of the gas in the float chamber 35 is measured by a pressure indicator 47 connected to the float chamber. Any sudden change in the amount of liquid contained in the float chamber 35 would compress the vapors and gas and thereby increase the pressure within the float chamber 35. Therefore, it is necessary that the volume of liquid contained in the chamber be substantially constant. This is accomplished by using the float valve so that any increase in liquid volume would cause the float to be raised by the buoyant force, and the needle valve 46 is opened so that the excess liquid may be exhausted through the drain line 48.

While the instrument has been described using constant temperature baths to maintain the desired temperatures, it is understood that other suitable means for heating or cooling the liquid may be employed.

The instrument of FIGURE 1 is particularly well adapted for measuring the vapor pressure of a gasoline, which pressure correlates well with the RVP, and the instrument has been used for this purpose as described below. The pump 13 supplies a stream of gasoline at a steady flow rate to the saturation chamber 22 which is immersed in the constant temperature bath 11 maintained at a constant temperature between 32° F. and 40° F. The bath fluid 12 preferably is water which may be maintained at about 36° F. by means of the heat exchanger 17 which may be a refrigerator, circulating pump 18, and thermostat 19.

The temperature of the gasoline after passing through the coil 16 is about 36° F. The cooled gasoline is then carried by line 21 to the saturation chamber 22 where it is introduced therein by means of the spray nozzle 23. The vent line 28 is open to the atmosphere, therefore, the vapor space within the saturation chamber 22 contains air at atmospheric pressure. The gasoline sprayed into the chamber comes into intimate contact with the air so as to readily absorb an equilibrium amount of air.

The partial pressure at 36° F. of gasolines with RVP's between 8 and 14 p.s.i. vary between about 2 and 5 p.s.i. Thus, if atmospheric pressure is 14.7 p.s.i., and 8 pound RVP sample will be saturated with air at a partial pressure of about 12.7 p.s.i. and a 14 pound RVP sample will be saturated with air at a partial pressure of about 9.7 p.s.i.

The pumping rate of pump 13 may be set at about 70 cc. per minute and the pumping rate of pump 31 may be set at about 60 cc. per minute. Thus, about 10 cc. per minute of gasoline are allowed to overflow through the standpipe 24 and no undissolved air is entrained in the saturated gasoline withdrawn through line 29. The gasoline withdrawn from the saturation chamber may be passed through the heat exchanger 33 to cool incoming gasoline and reduce the load on the refrigerator.

The gasoline saturated with air is then passed by way of line 34 to the heat exchanger means 41 which serves as a heater and may be immersed in the second constant temperature bath 36 which is maintained at about 100° F. by means of heater 37 and thermostat 38. The heat exchange means 41 may be a coiled tube of appropriate size to effectively heat the gasoline to the bath temperature. The heated gasoline is then carried by line 42 into the float chamber 35. The use of a spray nozzle 43 permits the liquid gasoline, the vaporized gasoline and the air to readily attain equilibrium. After a sufficient period of time in the float chamber the vapor and liquid phases are in equilibrium and the incoming gasoline and the outgoing gasoline carry the same amount of air. Normally, this would require about 10 to 15 minutes.

At this point the absolute pressure in the chamber is the sum of the gasoline vapor pressure at 100° F. and the partial pressure of the air in the chamber. This pressure is measured by means of the pressure indicator 47 connected to the chamber. The float 44 and needle valve 46 maintain a constant liquid gasoline level within the float chamber 35 with the excess gasoline being exhausted through the drain line 48.

The instrument as described above has been tested for sensitivity to composition and to dissolved air. The results of these tests indicate that samples which have been saturated with air at pressures up to 45 p.s.i.a. give good correlation with the Reid method. Also, the sensitivity to composition has been found not to cause any serious errors in the correlation with the Reid method.

Another instrument similar in principle to the apparatus of FIGURE 1 is shown in FIGURE 2. However, the apparatus of FIGURE 2 is simplified in operation and more suitable for field use or for plant use wherein it is desirable to measure the vapor pressure of a flowing plant stream.

The apparatus of FIGURE 2 includes a means for supplying a liquid 51 which preferably is a reciprocating pump. The supply means 51 may deliver the liquid by line 52 to a heat exchange means 53 used to bring the liquid to the desired saturation temperature. For purposes of convenience it may be desirable to immerse the heat exchange means 53, the saturation chamber 56 and the vaporizer 63 in a constant temperature bath 50. The bath temperature may be readily maintained at the desired temperature by a suitable heater or refrigerator and a thermostat.

After heating to the desired saturation temperature the liquid may be passed by line 54 into a saturation chamber 56 which is also maintained at the saturation temperature. The gas with which it is desired to saturate the liquid is supplied to the saturation chamber 56 at a pressure which will result in the same partial pressure of the gas within the chamber as the partial pressure of the gas above the liquid at a particular temperature and pressure selected for the purpose of the test. This pressure may be made a function of the measured vapor pressure and the gas may be supplied to the saturation chamber 56 by means of a pressure transmitter 59 which is responsive to the vapor pressure of the liquid.

A liquid level is maintained within the saturation chamber 56 by using a float valve 61. The vapor space above the liquid will thus contain equilibrium vapors and gas supplied by the transmitter 59 through line 58. The liquid from line 54 preferably is introduced into the vapor space by a spary nozzle 57 which permits the liquid to come into intimate contact with the gas and absorb an equilibrium amount of gas. The actual amount of gas which is absorbed will be dependent upon the partial pressure of the gas above the liquid at the saturation temperature.

The liquid saturated with the gas may be withdrawn from the saturation chamber through line 62 and passed into the vaporizer coil 63 which is a heat exchange means 63 serving to bring the gas-saturated liquid to the desired temperature. The liquid, equilibrium vapors and gas may be withdrawn from the vaporizer coil 63 at any rate greater than the liquid supply flow rate by supply means 51. The pressure of the equilibrium vapors and gas within the vaporizer coil 63 may be measured by a pressure indicator 60, which is preferably a pressure recorder connected by line 66 to vaporizer coil 63. The means for withdrawing the liquid and gasiform fluids from the vaporizer coil 63 is preferably a positive displacement pump 67 which is capable of exhausting the liquid and gasiform fluids at a constant rate.

The apparatus of FIGURE 2 has been successfully used to simulate the Reid vapor pressure method as will be described. A gasoline stream is supplied by pump 51 at a steady flow rate to the heat exchange means 53 which preheats the gasoline to a temperature of about 100° F. The constant temperature bath 50 is preferably maintained at 100° F. The heated gasoline passes by way of line 54 through a spray nozzle 57 and into the saturation chamber 56. The pressure transmitter 59 which controls the pressure of the air supplied to the chamber is responsive to the pressure in the vaporizer coil 63. Air is supplied through the pressure transmitter 59 and line 58 to the saturation chamber 56 at a pressure which will result in the same partial pressure of the air within the chamber as the partial pressure of the air above the gasoline at a temperature of between 32° and 40° F. and a pressure of one atmosphere. A liquid level is maintained in the saturation chamber 56 by using a float valve 61 as previously described. The pressure within the saturation chamber 56 will always be greater than the pressure within the vaporizer coil 63. Hence, the flow of gasoline from the chamber is facilitated. The gasoline passes into the vaporizer coil 63 and is heated to a temperature of 100° F. The heated gasoline, the equilibrium vapors and air are withdrawn from the vaporizer coil by the positive displacement pump 67 at a rate greater than the supply rate controlled by pump 51. Ideally, the vaporizer coil 63 is not filled with gasoline, but it provides a large surface area having a film of liquid gasoline along its length whereby the vapors are more readily stripped from the liquid.

The pump 67 is preferably a positive displacement pump capable of pumping liquids, vapors and gases at a constant rate, and is set to withdraw the fluids from the vaporizer coil 63 at a rate of 5 times the pumping rate of the supply pump 51. As an example, the pump 51 may be set to pump at a rate of 40 cc. per minute and the pump 67 set to pump at a rate of 200 cc. per minute. This effectively strips the vapors from the liquid in the vaporizer coil 63 by the positive displacement action of the exhaust pump 67 in a manner corresponding to the Reid method. Withdrawal rates may vary considerably for other purposes however. For instance, in one test method it has been desirable to withdraw at a rate of 25 times the supply rate. For the best operation the exhaust pump preferably discharges into an atmospheric sump.

In order to prevent the condensation of vapors within the pump 67 it is preferred to utilize a circulation pump 68 to circulate the fluid of the constant temperature bath 50 through a jacket surrounding the pump 67 so that the temperature of the pump 67 is maintained at the test temperature.

A means for indicating the total pressure within the vaporizer coil 63, preferably a conventional pressure recorder 60, is provided. A seal pot 64 is advantageously used in the line between the connection at the bottom of the vaporizer coil 63 and the pressure recorder 60. The fluid used in the seal pot 64 preferably is kerosene or a heavy naphtha, but other liquids may be used. The use of the seal pot 64 dampens out minor pressure variations caused by intermittent liquid full conditions in the lines and assures more accurate measurement of the pressure within the vaporizer coil 63. The pressure transmitter 59 is connected to the line 66 between the pressure recorder and the seal pot, and the air supplied to the saturation chamber 56 by the transmitter is controlled by the pressure within the vaporizer coil 63. The transmitter output which determines the partial pressure of the air within the saturation chamber 56 is thus a function of the vapor pressure of the gasoline, and the transmitter 59 is readily calibrated to perform this function. The calibration for the transmitter is obtained by using the values for the vapor pressure of a gasoline as a function of temperature. The partial pressure of the air in the saturation chamber must be equal to the partial pressure of the air above the surface of the same sample when it is in equilibrium at a total pressure of one atmosphere and a temperature between 32° F. and 40° F., preferably at 36° F., which are the conditions for saturation for the Reid vapor pressure method. Under the latter conditions the partial pressure of air is equal to the atmospheric pressure ($P_a$) less the vapor pressure of the gasoline at 36° F. ($^{36}P_g$). The partial pressure of air in the saturation chamber during testing is equal to the total pressure in the saturation chamber ($P_s$) less the vapor pressure of the gasoline at 100° F. ($^{100}P_g$). Equating the two partial pressures, $$P_s - {}^{100}P_g = P_a - {}^{36}P_g$$

or $$P_s = P_a + ({}^{100}P_g - {}^{36}P_g)$$

the quantity ($^{100}P_g - {}^{36}P_g$) is a function of the Reid vapor pressure of the gasoline. By using the literature values of $^{100}P_g$ and $^{36}P_g$ for gasolines with Reid vapor pressures within the range of the gasolines produced by the function may be readily obtained. These values are then used in the calibration of the pressure transmitter 59.

FIGURE 3 graphically indicates the correlation with the Reid method which is obtained with the apparatus of this invention. Differences in observed pressure readings result because essentially all of the dissolved air is stripped from the gasoline in the vaporized coil 63 of the instant apparatus. It will be noted that the Reid method causes a slight amount of air to be driven from the air chamber into the liquid gasoline. However, this difference has been found to be consistent, and hence, the correlation is well within the accepted range of accuracy.

Having described our invention, what we claim is:

1. An apparatus for continuously determining the vapor pressure of a mixture of liquids having different boiling points and having a gas dissolved therein which apparatus comprises means for supplying said liquids to said apparatus; saturation chamber means for receiving said liquids; pressured gas supply means; pressure control means for receiving pressured gas and delivering said gas to said saturation chamber; means for saturating said liquids with said gas; means for heating said liquids containing said dissolved gas to a preselected temperature; means for withdrawing said liquids, equilibrium vapors and gas from said heating means; means for stripping said vapors and gas from said liquid at a preselected rate; and means for indicating the total pressure of the vapors and gases in equilibrium with said liquids, said pressure control means being responsive to said indicated total pressure whereby gas is delivered to said chamber at a partial pressure equal to the partial pressure of said gas above said liquids at a particular temperature and pressure.

2. An apparatus for continuously determining the vapor pressure of a gasoline which apparatus comprises means for supplying gasoline to said apparatus at a steady flow rate; saturation chamber means for receiving said gasoline; pressured air supply means; pressure control means for receiving pressured air and delivering said air to said saturation chamber; means for maintaining a constant liquid level in said chamber and permitting liquid to be withdrawn from said chamber; means for heating said withdrawn gasoline containing said dissolved air to a preselected temperature; means for withdrawing said gasoline, equilibrium vapors and air from said heating means at a rate greater than said gasoline supply flow rate whereby said vapors are stripped from said gasoline; and means for indicating the total pressure of the vapors and gases in equilibrium with said gasoline in said heating means, said pressure control means being responsive to said indicated total pressure whereby air is delivered to said chamber at a partial pressure equal to the partial pressure of air above said gasoline at a particular temperature and pressure.

3. The apparatus of claim 2 wherein said pressure control means comprises a pressure transmitter for receiving said pressured air and delivering air to said saturation chamber, said transmitter being responsive to said indicated total pressure whereby air is delivered to said chamber at a partial pressure equal to the partial pressure of air above said gasoline at a particular temperature and pressure.

4. The apparatus of claim 2 wherein said means for withdrawing said gasoline, equilibrium vapors and air from said heating means comprises a positive displacement pump.

5. The apparatus of claim 2 wherein said means for withdrawing said gasoline, equilibrium vapors and air is adapted to operate at five times said gasoline supply rate.

6. The apparatus of claim 2 wherein said means for providing air to said saturation chamber is adapted to provide air to said chamber at a partial pressure corresponding to the partial pressure of air in equilibrium with said gasoline at atmospheric pressure and a temperature between about 32° F. and about 40° F.

7. The apparatus of claim 2 which includes a preheater means positioned upstream of said saturation chamber and wherein said preheater means is adapted for heating said supplied gasoline to about 100° F., and wherein said heating means is adapted to heat said gasoline and dissolved air to about 100° F.

8. An apparatus for continuously determining the vapor pressure of a gasoline which apparatus comprises means for supplying gasoline to said apparatus at a steady flow rate; a constant temperature bath maintained at 100° F.; a preheater immersed in said bath for receiving said gasoline and capable of heating said gasoline to a temperature of about 100° F.; a saturation chamber immersed in said bath and adapted to receive said gasoline from said preheater; a pressure transmitter for supplying air to said saturation chamber at a partial pressure of air equal to the partial pressure of air above the surface of said gasoline when it is in equilibrium therewith at a total pressure of one atmosphere and at a temperature between about 32° F. and 40° F.; means for introducing said gasoline into said saturation chamber whereby said gasoline comes into intimate contact with said air to effectively saturate said gasoline with said air; a float valve for maintaining a liquid level in said saturation chamber; means for withdrawing said gasoline containing said air dissolved therein from said chamber; a vaporizer immersed in said bath and adapted to receive said gasoline withdrawn from said chamber and capable of heating said gasoline to about 100° F.; a pump for withdrawing said liquid gasoline, equilibrium vapors and gases from said vaporizer at a rate 5 times said gasoline supply flow rate; a pressure recorder communicating with said vaporizer for recording the vapor pressure of said gasoline contained in said vaporizer; and means for circulating the fluid of said bath through said pump whereby said pump is maintained at a temperature of about 100° F.

References Cited in the file of this patent
UNITED STATES PATENTS

| | | |
|---|---|---|
| 2,002,101 | Valby et al. | May 21, 1935 |
| 2,540,377 | Pachaly | Feb. 6, 1951 |
| 2,671,340 | Jacobs et al. | Mar. 9, 1954 |
| 2,671,343 | Jacobs et al. | Mar. 9, 1954 |
| 2,722,826 | Milligan et al. | Nov. 8, 1955 |